March 23, 1971　　　　J. L. JEANNERET　　　　3,572,193
DEVICE FOR MACHINING A WORKPIECE ON A LATHE BY THE
SIMULTANEOUS TRANSVERSAL FEEDING OF SEVERAL TOOLS
Filed July 15, 1968

United States Patent Office 3,572,193
Patented Mar. 23, 1971

3,572,193
DEVICE FOR MACHINING A WORKPIECE ON A LATHE BY THE SIMULTANEOUS TRANSVERSAL FEEDING OF SEVERAL TOOLS
Jules Louis Jeanneret, 13–21 Rue Henri Gelin 79, Niort, France
Filed July 15, 1968, Ser. No. 744,745
Claims priority, application France, July 21, 1967, 115,165
Int. Cl. B23b 21/00
U.S. Cl. 82—25                    5 Claims

ABSTRACT OF THE DISCLOSURE

Device for mounting on an automatic copying lathe for the simultaneous transverse feeding of several tools, comprising a longitudinally movable adjustable tool carrier which is transversely movable with respect to the axis of the piece by means of a mechanical transmission.

---

The present invention relates to lathes and in particular to lathes wherein certain contours, necessitating the transverse feeding movement of a cutting tool, in the direction of the axis of a piece to be machined, are to be made.

It is already known that if contours, such as necked portions or grooves having different forms are to be machined on workpieces having circular cross-section, that it is necessary to cause the cutting tool to be moved in a transverse direction. This method of machining is essentially characterized in that the tool which machines the workpiece is provided with a radial feeding movement while resting immovable in the longitudinal direction. This movement of the cutting tool is distinguished from that of a longitudinal feeding operation in that the cutting tool, resting a constant distance from the axis of the workpiece, is provided with a longitudinal feeding movement. Apart from the possibility that it offers for forming circular necked portions or grooves, the transverse feeding movement of the cutting tool is used for machining a piece at any point before starting the transverse feeding movement, when it is not possible to machine the piece at its ends, for example, screw-cutting operations.

In the improved lathes, transversely moving carriages exits which are specialized in the radial machining of the workpiece by the transverse feeding of a cutting tool, while the longitudinal cutting operations are carried out by another carriage. This type of device is particularly useful in copying lathes with which it is possible to make the two carriages work simultaneously by controlling them through an automatic cycling control means.

However, these known machines only allow a single necked portion or groove to be machined, or a limited number of necked portions or grooves having identical shapes successively machined and any change in the shape of the groove requires a change in the cutting tool.

For increasing the speed of execution of such macchines, multiple tool holders are already known which may be fixed on a carriage for use in radial transverse feeding operations. These multiple tool carriages allow the simultaneous machining of several necked portions or grooves to be performed on the condition that these necked portions or grooves are confined along a relatively small length on one portion of the workpiece. These devices do not allow varying types or sizes of grooves to be machined along the entire length of a workpiece.

Specialized machine tools which allow successive grooves such as helical slots to be machined on a workpiece are also known. These devices use a battery of identical tools which are transversely moved into contact with the workpiece along its entire length, but these machines are highly complex and are only formed to operate on particular types of workpieces, and their use, thesefore, is limited.

In accordance with this invention, the device comprises an adjustable tool holder longitudinally mounted on two parallel slides transversely movable with respect to the axis of the piece to be machined and connected together by a mechanical movement transmission means.

The present invention has for an object the creation of an easily fabricated device, and which allows, when it is installed on a lathe, a very large number of simultaneous transverse movements to be obtained, over an interval which represents practically the entire distance between the two centers of the lathe which hold the piece to be machined and, if the need arises, with different tools.

To this effect, the invention has for an object a machining device for a workpiece on a lathe by the simultaneous transverse feeding of several tools characterized in that it comprises an adjustable tool holder longitudinally mounted on two parallel slides, transversely movable with respect to the axis of the piece to be machined and connected by a mechanical transmission.

The device for transverse feeding movements of multiple tools which has just been described allows, in a very simple manner, the proposed object to be obtained.

In effect, the adjustable tool carriers are disposed opposite the piece to be machined, a considerably large number of cutting tools may be therefore fixed side by side. These cutting tools may have identical or different shapes, their cutting edges being placed in the same plane passing through the axis of the workpiece.

By transversely displacing the adjustable tool carrier toward the workpiece, parallel to this plane, the multiple cutting tools simultaneously machine the workpiece and form circular necked portions or grooves whose shape and depth may be varied along the length of the workpiece.

The device thus described, is especially useful for the mass-production of identical pieces on automatic lathes. Furthermore, because of its simplicity, the device may be made so as to be removably mounted on an existing lathe, in the case of need.

Other objects and features of the invention will become apparent to those skilled in the art as the disclosure is made in the following description of a preferred embodiment of the invention as illustrated in the accompanying drawings wherein.

Figure 1:
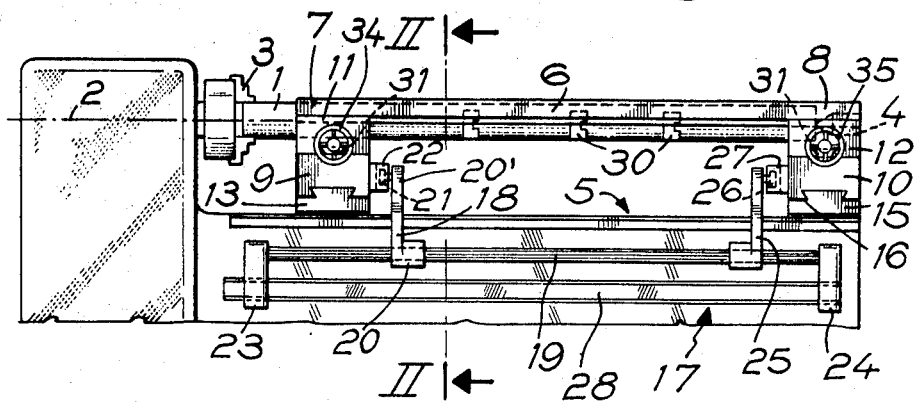
FIG. 1 is a side elevation of a lathe equipped with a device in accordance with this invention.

These figures show a lathe having a long workpiece 1 fixed along an axis 2 by the means of a mandrel 3 and a center 4.

An absolutely rigid adjustable tool carrier 6, having a length which is approximately equal to a bed 5 of a lathe, is mounted parallel to the axis 2 in the neighbourhood of a horizontal diametrical plane 2' offset from the axis 2 of the workpiece.

This adjustable toolholder 6 is fixed by its two ends 7 and 8 on two parallel horizontal slides 9 and 10, perpendicular to the axis 2 of the workpiece 1, by the instrumentality of two transoms 11 and 12 in which it is held by a lower dovetailed portion 6'. These transoms allow the adjustable tool carrier 6 to be transversely positioned. These transoms are in turn movably mounted on dovetailed slide bars 31 of the slides 9 and 10 perpendicular to the axis of the workpiece and are driven by micrometric screws 32 and 33 controlled by hand-wheels 34 and 35.

In the example shown, the slide 9 is placed to one side of the mandrel 3 and is mounted on a transversely moving carriage 13 mounted on slide bars 14 placed on the bed of the lathe 5. This transversely moving carriage is driven by any standard means, either mechanically, or electrically, and these movements may be automatically controlled if the lathe includes an automatic cycling control means.

At the other end of the lathe bed 5, a bed plate 15 is mounted on the slide bars 14. This bed plate 15 allows the slide 10 to be adjusted, by appropriate slide bars 16. This slide 10 does not include a separate motor means.

The slide 10 is driven from the slide 9 of the transversely moving carriage 13 by a countershaft mechanism 17 in such a manner that the adjustable tool carrying means 6 may be moved parallel to the horizontal diametrical plane 2' while always remaining perfectly parallel to this plane 2'.

This mechanism 17 comprises a lever 18 keyed on a very rigid transmission rod 19 by one of its ends 20, and carries at its other end 20' a roller 21 movably mounted in a vertical guiding slot 22 provided on the side face of the slide 9.

The transmission rod 19, parallel to the axis 2 of the workpiece 1, is rotatably mounted at its ends in two bearing means 23 and 24 fixed to the lathe bed 5, in such a manner that the lever 18 may pivot about the axis of the rod 19 with respect to the bed 5.

A second lever 25, identical to the lever 18 and parallel to this lever, is keyed on the other end of the rod 19, and includes a roller 26 movably mounted in a guiding slot 27 formed on the side face of the slide 10.

The two bearing means 23 and 24 are fixed on the lathe bed 5 by the aid of a guide strip 28 having a dovetailed contour and which extends over the entire length of the bed 5.

Any movement of translation of the slide 9 of the transversely moving carriage 13 causes the lever 18 to pivot, and which, by the instrumentality of the rigid rod 19, causes an identical pivoting of the lever 25 and finally a movement of translation of the slide 10 which is identical to that of the slide 9. These movements cause the adjustable tool holder 6 to move in a direction which is parallel to itself and which is permanently parallel to the axis 2. In this movement, the slide 10 is pushed or pulled along its axis. The distance between the center of the guiding slot 27 and the axis of this slide is kept to a minimum in order to eliminate any tendency of the slide 10 to become bound or wedged on the slide bars 16.

The dovetailed lower portion 6' of the adjustable tool holder 6 allows any desired number of tools 30 to be fixed side by side along the entire length of the workpiece 1. The position of these tools is so regulated that their cutting edges are always in the diametrical plane 2'. It is clear that these tools may also be fixed by any other convenient means along the adjustable tool holder 6.

When the transversely moving carriage 13 begins its movement, the slide 9 causes the displacement of the adjustable tool holder 6 parallel to itself, by the instrumentality of the mechanism 17. The cutting edges of the tools 30 always remaining in the plane 2'.

The position of the tools may be adjusted so that their depths of penetration into the workpiece are different.

For a given path of the transversely moving carriage 13 and thus of the adjustable tool holder 6, the distance of the cutting tools 30 from the axis 2 may be individually regulated, but, with the aid of the movable transoms 11 and 12 the distance of the entire adjustable tool holder 6 from the axis 2 may also be adjusted, and, therefore, the depths of cut of all of the cutting tools 30.

On the other hand, in accordance with an advantageous mode of realisation, the two slides 9 and 10 may be longitudinally movable on the bed 5, while the rod 19 is keyed or grooved in such a manner that the levers 18 and 25 are allowed to slide along the length of this rod without turning.

This allows adjustable tool holders 6 of different lengths to be used or to adapt the useful length of the adjustable tool holder 6 to the length of the workpiece 1 to be machined.

The entire device described above is movable, and the bearing means 23 and 24 may be easily removed due to their being mounted on the slide bar 19.

Figure 2:
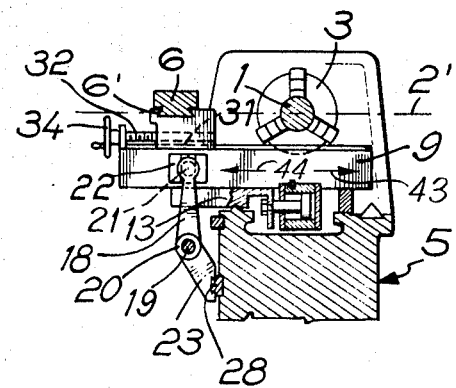
FIG. 2 shows a section of the device taken on the line II—II of FIG. 1.
Figure 3:
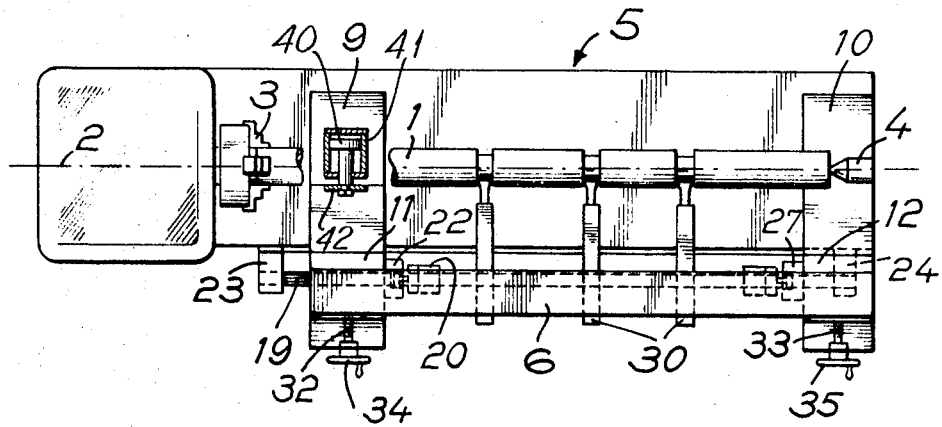
FIG. 3 illustrates a simplified plan view of the apparatus shown in FIG. 1.

FIGS. 2 and 3 illustrate a known type of hydraulic control means for controlling movement of slide 9 on carriage 13. Such control means is well known and comprises a known hydraulic jack which is correlated with the cycle of the machine.

Slide 9, which transversely movable as shown by arrows 43 and 44, is rigid with cylinder 41 within which a piston 40 is mounted, said piston being fixed to support 42 which in turn is rigid with carriage 13. A hydraulic pump and a distributor (but not shown) assure the feeding of liquid to the jack, and alternately direct a certain quantity of said liquid into the respective chamber of cylinder 41 on opposite sides of piston 40.

A device such as that which has just been described may be mounted, without difficulty, on a lathe already equipped with standard type tools for the usual type of machining operations either for copying or not. The arrangement of this device on a lathe may also be modified. The adjustable tool holder can be made movable in the non-horizontal plane, and, for example, vertical. In a general manner, the devices which have been just described may be changed without departing from the spirit and the scope of the invention.

What I claim is:

1. A device for machining a workpiece on a lathe and simultaneously feed a plurality of machining tools transversely to a workpiece axis, said device comprising: two parallel slides transversely movable relative to such an axis and spaced apart from each other along the longitudinal extent of such axis, an elongate tool holder extending between said slides and connected to each one thereof, said holder having means to support a plurality of tools at spaced locations from each other along its length, and a movement transmission means mechanically connecting said slides together whereby they are integrally movable relative to each other.

2. Device in accordance with claim 1 wherein one of the slides is motorized and drives the other slide by the intermediary of the mechanical movement transmission means.

3. Device in accordance with claim 1 wherein the mechanical movement transmission means comprises a longitudinal transmission rod rotatably mounted in bearing means fixed to the lathe bed; two parallel levers keyed at one of their ends on said transmission rod and the other end of each of said levers being respectively connected to the two slides.

4. Device in accordance with claim 1 wherein the tool holder is provided with a bottom portion machined so as to have a dovetailed shape and which portion allows both the mounting of said tool carrier on the slide and the fixation of the cutting tools thereto.

5. Device in accordance with claim 1 including slidable transoms by which the tool holder is mounted on the slides; said transoms being adjustable with respect to the axis of the piece to be machined.

References Cited
UNITED STATES PATENTS

| | | | |
|---|---|---|---|
| 872,233 | 11/1907 | Hartness | 82—25 |
| 1,353,686 | 9/1920 | Wallace | 82—25 |
| 1,610,981 | 12/1926 | Thacher | 82—25X |

LEONIDAS VLACHOS, Primary Examiner